Dec. 1, 1942.  D. A. WILLIAMS  2,303,415
GROUND CLEARING FORK FOR STEAM SHOVELS AND THE LIKE
Filed Jan. 3, 1940
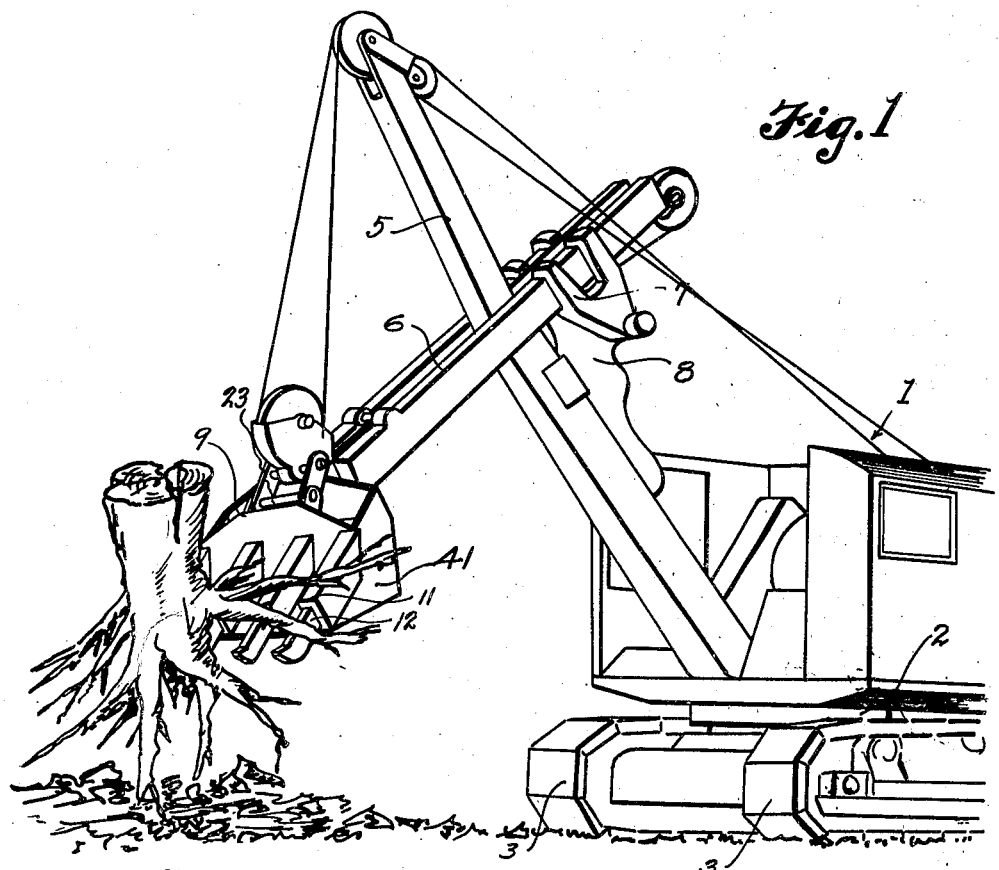
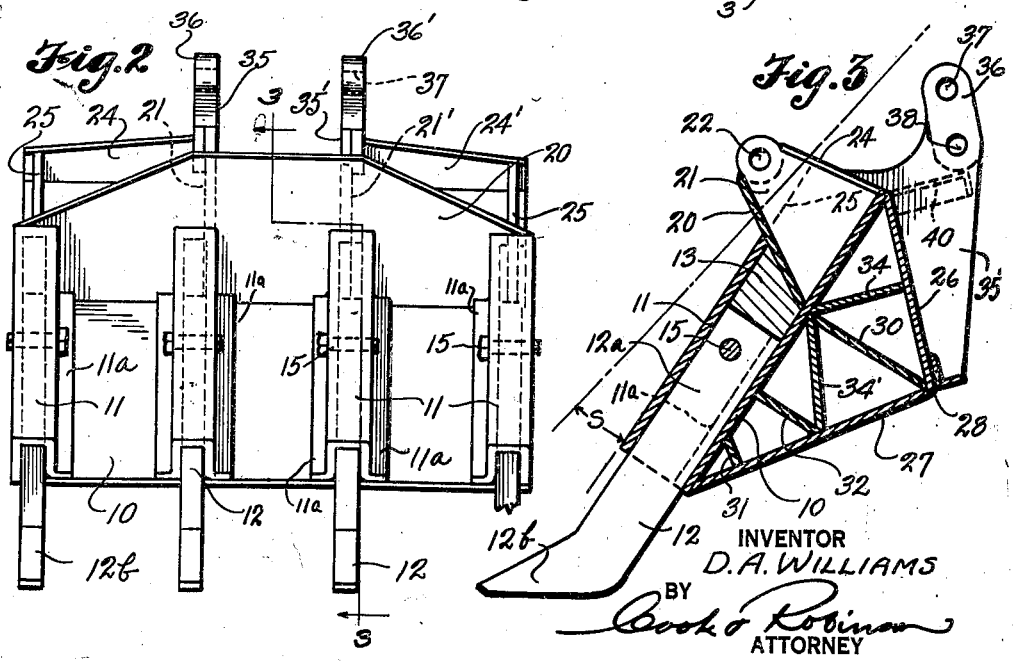
INVENTOR
D. A. WILLIAMS
BY
ATTORNEY

Patented Dec. 1, 1942

2,303,415

UNITED STATES PATENT OFFICE 2,303,415

GROUND CLEARING FORK FOR STEAM SHOVELS AND THE LIKE

Dayton A. Williams, Tacoma, Wash.

Application January 3, 1940, Serial No. 312,217

4 Claims. (Cl. 37—2)

This invention relates to land clearing attachments for use with the common types of power operated shovels, and it has reference more particularly to a novel form of fork, or rake, adapted to replace, or to be used for land clearing operations interchangeably with the usual bucket or dipper on the dipper stick of the shovel.

It is the principal object of this invention to provide a novel, practical and substantial form of device, referred to as a fork or rake, for use on the dipper stick of the ordinary type of power shovel in lieu of the usual dipper or bucket, and which may be applied to the stick without requiring any alteration thereof either in structure or mode of operation, for land clearing operations, such, for example, as the raking or combing of rocks, stumps, brush or other debris from the ground surface and the pushing of the raked up material to the side of the line of advancement or ahead of the shovel.

More specifically stated, the objects of the present invention reside in the provision of a ground clearing fork designed for ready attachment to the dipper stick of the ordinary types of power driven shovels, and comprising a frame structure that is substantially and rigidly braced, and in such manner that the bracing is in the clear of the rake operations. Furthermore, to provide a rake on which there is a plurality of teeth, disposed at such angle with reference to the line of the stick that the usual scooping action of the ordinary dipper is avoided and an effective, thorough raking operation may be accomplished by the normal actions of the shovel boom and stick.

Other objects of the present invention reside in the details of construction and relationship of those parts embodied in the rake, and in the combination of the rake structure with the dipper stick for the specific purpose above stated. The invention particularly concerns the determination of the proper or most desirable angle of the teeth with reference to the direction of the dipper stick for avoiding a scooping action, and producing a satisfactory combing or raking operation.

In accomplishing the above stated and other objects of the present invention, I have provided the improved details of construction, the preferred forms of which are illustrated in the accompanying drawing, wherein—

Fig. 1 is a perspective view showing a shovel in which the dipper stick is equipped with a ground clearing fork in accordance with details of the present invention.

Fig. 2 is a front view of the fork.

Fig. 3 is a vertical section taken on the line 3—3 in Fig. 2, particularly illustrating the mounting of the fork teeth and the bracing of the frame structure.

Referring more in detail to the drawing—

1 designates what may be a steam shovel, or power operated shovel of the conventional present-day form of construction. The main frame structure of the shovel is mounted on a turn table 2, which is equipped with crawler type supports 3. Mounted by the frame structure of the shovel is the usual forwardly directed boom 5, adapted to be raised or lowered in a vertical plane, as desired, or required, for any particular work, and on which boom a dipper stick 6 is operatively supported. The dipper stick, as here shown, is longitudinally adjustable in a guide 7 that is pivoted on a support 8 which, in turn, is fixed on the boom. The stick 6, in this instance, is adapted to be adjusted in the vertical plane of the boom from a substantially vertical position, to a substantially horizontally extended position, while the boom likewise is adjustable between substantially a vertical position to substantially a horizontal position; it being understood that the adjustment of these parts may be accomplished in the usual manner by means of cables and winding drums, already existing as operating parts of the steam shovel, and well known in the art, and which do not constitute a part of the present invention, and therefore will not be described in detail.

The fork, or rake, embodied by this invention, is mounted at the lower end of the dipper stick and is applicable to the stick of the usual shovel upon removal of the dipper or bucket therefrom. In Fig. 1, the rake is designated in its entirety by reference numeral 9.

The present preferred construction of the fork, or rake, is best illustrated in Figs. 2 and 3. It comprises a flat base plate 10 of rectangular form and extending the full width of the rake. Mounted on this plate, along its opposite side edges, and equally spaced between the side edges, are channel irons 11, each providing a mounting socket for a rake tooth 12.

The channel irons 11 have longitudinal edge flanges 11a, which are welded or otherwise secured to the base plate 10, and they extend from flush with the lower edge of the base plate, to near the upper edge, where they are joined to a cross web as presently explained.

Each tooth 12 comprises a straight shank portion 12a of rectangular cross section, that has its upper end portion removably fitted in one of the mounting sockets provided by the channels 11. All teeth extend beyond the lower, transverse edge of the base plate, and each tooth terminates in a forwardly directed, pointed toe 12b. At their upper ends, the shanks are square cut and abut flatly against iron blocks 13 that are seated on the upper, closed ends of the channel sockets. The teeth are held in their respective sockets by means of bolts 15 that are extended through the guide channels and through the shanks of the teeth therein.

Welded to the base plate 10 transversely thereof and near the rear, and top edge of the plate 10, is a back plate 20. This back plate is somewhat rearwardly inclined relative to the plane of the base plate 10, as noted in Fig. 3, and extends clear across the base plate. The rear ends of the channels 11 are beveled to fit the inclined position of this plate and are welded thereto.

Disposed upon the base plate 10, perpendicularly thereto and parallel with the side edges, are two spaced web plates 21 and 21'. These plates, as shown in Fig. 2, are substantially in alinement with the two inner teeth of the fork. The webs extend somewhat above the plane of the top surfaces of the channels 11 and are equipped with holes 22 in transverse alinement for reception of a bolt, as noted at 23 in Fig. 1, in mounting the rake on the dipper stick. These web plates 21 and 21' are braced against lateral forces by webs 24 which are welded to the base plate 10 along its top and rear edge, and extend from the webs 21 and 21' outwardly to the side edges of the base. These webs 24 are inclined at an angle as shown in Fig. 3, toward the top edge of the cross plate 20. Bracing webs 25 are disposed between the outer end portions of the plate 20 and webs 24 to further strengthen and stiffen the construction.

As noted in Fig. 3, the base plate 10 has supporting bridging, comprising flat, rectangular plates 26 and 27 which have edges welded respectively to the top and lower edges of the base plate and have their other edges brought together and welded as at 28, to form a ridge. In cross section, the plates 10, 26 and 27 form a triangle of which the plate 10 comprises the long side. A web plate 30 extends transversely of the base plate, perpendicular thereto and has its lower edge welded in the joint of the plates 26 and 27. Also, webs 31 and 32 are inserted between the plates 10 and 27 and diagonal webs 34 and 34' extend from the medial portions of the plates 26 and 27 to the plate 10 along the joint with the web 30.

At the back of the frame thus provided are two vertical, spaced webs 35 and 35', which are symmetrically located with reference to the center line of the rake and are alined with the mounting webs 21 and 21'. The webs 35 and 35' are equipped with bearing portions 36 having upper and lower sets of openings 37 and 38 therethrough, for receiving mounting bolts whereby to attach the rake frame structure to the dipper stick. The webs 35 and 35' have lateral bracing as noted at 40 in Fig. 3, and they are welded along their inner vertical edges to the back plate 26 of the bridging. It will be mentioned also that the bridging is further strengthened by the welding thereto of end plates, as at 41 in Fig. 1.

In mounting the rake or fork on the dipper stick 6, as shown in Fig. 1, the plane of the rake teeth, also of the base plate 10, preferably will be kept at a slight angle with and below the line of the dipper stick. This angle, which is designated as the angle S in Fig. 3, for most work, is kept near 10°. However, it might vary from that degree anywhere from 20° above the line of the upper stick to 30° or 40° below the line of the stick. This angle provides that, in the normal use and operation of the stick, the teeth may be used to push or rake up trash ahead of the shovel, without having the usual scooping action, and to properly comb the ground.

By reference to Fig. 2, it will be observed that the teeth 12 and base plate 10 form what may be referred to as the base of the rake, while the cross plate 20 forms a back. In a forward raking action of the teeth, with the dipper stick in an upwardly directed position, the teeth and base will cause a very effective raking action.

Thus the device serves very effectively for its intended purpose, either in removing rock, stumps, brush or other debris. It is possible, if such use is desired, to extend the boom and stick so as to use the rake for a modified shoveling operation, or for lifting such objects as the stump shown in Fig. 1, out of the path of travel.

It is anticipated that rakes of this kind might be made in various ways different from that here shown and described. For example, it is possible to make a frame structure with integrally cast teeth. It is also possible to form a frame with teeth bolted or permanently fixed therein without use of the channel members 11. Also, chambers or sockets might be made in various ways for the removable mounting of rake teeth. Therefore, it is not desired that the following claims be confined strictly to the structure illustrated, but that they be given an interpretation commensurate with the invention described.

Having thus described my invention, what I claim as new therein and desire to secure by Letters Patent is:

1. In a shovel of the character described having a boom and a dipper stick mounted on the boom for actuation in the vertical plane of the boom; a ground clearing fork mounted on the lower end of the stick; said fork comprising a frame structure, a plurality of parallel socket forming members fixed in the frame, teeth mounted in said socket forming members and extended from the lower edge of the frame in the same plane and in the same general direction as the line of the dipper stick.

2. A land clearing fork for steam shovels and the like employing a dipper stick; said fork comprising a flat, rectangular plate, mounting devices fixed to the plate at the upper edge for securing the plate to the dipper stick, a plurality of tooth mounting members fixed on the base plate in spaced relationship transversely thereof, ground raking teeth having shanks in said mounting members, and said teeth extending equally beyond the lower edge of said base plate and in a plane parallel to the base plate.

3. A land clearing fork for steam shovels and the like, equipped with a dipper stick; said fork comprising a flat rectangular plate, a back plate fixed transversely to and across the top edge of the base plate in an upright angle relative thereto, a plurality of channel members mounted on the base plate in parallel relation, and spaced apart transversely thereof, ground raking teeth having shanks removably mounted in said channel members and extending equally beyond the lower edge of the base plate, and mounting devices for the fork fixed to the top edge of the base plate and to said back plate, and adapted for mounting on the dipper stick with the teeth extending substantially in the direction of the stick.

4. A land clearing fork of the character described comprising a flat, rectangular base plate, plates secured to the under side of the plate for bracing it against bending, a back plate fixed to the base plate, transversely thereof and across the upper portion, and at an upright angle, a plurality of parallel, spaced channel members secured to the top of the base plate and extending from its lower edge to the back plate; each forming a tooth mounting socket, ground raking teeth mounted in said sockets and extended equally beyond the lower edge of the base plate and in a plane parallel thereto, and spaced sets of mounting plates fixed to the base plate and back plate to extend beyond the upper edges of the base plate for attachment to a power shovel stick.

DAYTON A. WILLIAMS.